United States Patent
Xu et al.

(10) Patent No.: US 11,703,460 B2
(45) Date of Patent: Jul. 18, 2023

(54) METHODS AND SYSTEMS FOR OPTICAL SURFACE DEFECT MATERIAL CHARACTERIZATION

(71) Applicant: KLA Corporation, Milpitas, CA (US)

(72) Inventors: Zhiwei Xu, Sunnyvale, CA (US); Kurt Haller, Pleasanton, CA (US); J. K. Leong, San Jose, CA (US); Christian Wolters, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 116 days.

(21) Appl. No.: 16/913,396

(22) Filed: Jun. 26, 2020

(65) Prior Publication Data

US 2021/0010949 A1    Jan. 14, 2021

Related U.S. Application Data

(60) Provisional application No. 62/871,872, filed on Jul. 9, 2019.

(51) Int. Cl.
*G01N 21/95* (2006.01)
*G01N 21/45* (2006.01)

(52) U.S. Cl.
CPC ......... *G01N 21/9505* (2013.01); *G01N 21/45* (2013.01); *G01N 2201/064* (2013.01); *G01N 2201/06113* (2013.01)

(58) Field of Classification Search
CPC .............. C07F 15/0033; C09K 11/06; C09K 2211/1007; C09K 2211/1011;
(Continued)

(56) References Cited

U.S. PATENT DOCUMENTS

| 5,864,394 A | 1/1999 | Jordan et al. |
| 6,169,601 B1 | 1/2001 | Eremin et al. |

(Continued)

FOREIGN PATENT DOCUMENTS

| KR | 10-2013-0047360 A | 5/2016 |
| WO | 2018064458 A1 | 5/2018 |

OTHER PUBLICATIONS

International Search Report dated Oct. 20, 2020, for PCT Application No. PCT/US2020/041088 filed on Jul. 8, 2020 by KLA-Tencor Corporation, 4 pages.

*Primary Examiner* — Tri T Ton
(74) *Attorney, Agent, or Firm* — Joseph S. Spano; Spano Law Group (57) ABSTRACT

Methods and systems for detecting and classifying defects based on the phase of dark field scattering from a sample are described herein. In some embodiments, throughput is increased by detecting and classifying defects with the same optical system. In one aspect, a defect is classified based on the measured relative phase of scattered light collected from at least two spatially distinct locations in the collection pupil. The phase difference, if any, between the light transmitted through any two spatially distinct locations at the pupil plane is determined from the positions of the interference fringes in the imaging plane. The measured phase difference is indicative of the material composition of the measured sample. In another aspect, an inspection system includes a programmable pupil aperture device configured to sample the pupil at different, programmable locations in the collection pupil.

20 Claims, 8 Drawing Sheets

(58) Field of Classification Search
CPC .... C09K 2211/1059; C09K 2211/1066; C09K 2211/1074; C09K 2211/1092; C09K 2211/185; G01N 2021/8822; G01N 21/45; G01N 21/9501; G01N 21/9505; G01N 2201/06113; G01N 2201/064; H01L 51/0054; H01L 51/006; H01L 51/0074; H01L 51/0081; H01L 51/0085; H01L 51/5016; H01L 51/5024; H05B 33/14
USPC .............................. 356/450, 4.09, 28.5, 35.5
See application file for complete search history.

(56) References Cited

U.S. PATENT DOCUMENTS

| | | |
|---|---|---|
| 6,201,601 B1 | 3/2001 | Vaez-Iravani et al. |
| 6,204,918 B1 | 3/2001 | Isozaki et al. |
| 6,208,411 B1 | 3/2001 | Vaez-Iravani et al. |
| 6,271,916 B1 | 8/2001 | Marxer et al. |
| 6,341,042 B1 | 1/2002 | Matsunaka et al. |
| 6,462,807 B1 | 10/2002 | Nishi |
| 6,466,315 B1 | 10/2002 | Karpol et al. |
| 6,486,946 B1 | 11/2002 | Stover et al. |
| 6,515,742 B1 | 2/2003 | Ruprecht |
| 6,529,270 B1 | 3/2003 | Bills |
| 6,608,676 B1 | 8/2003 | Zhao et al. |
| 6,891,627 B1 | 5/2005 | Levy et al. |
| 7,130,039 B2 | 10/2006 | Vaez-Iravani et al. |
| 7,295,303 B1 | 11/2007 | Vaez-Iravani et al. |
| 7,426,023 B2 | 9/2008 | Ohshima et al. |
| 7,436,508 B2 | 10/2008 | Wolters et al. |
| 7,492,451 B2 | 2/2009 | Vaez-Iravani et al. |
| 7,643,157 B2 * | 1/2010 | Takizawa ............... G03F 1/84 356/520 |
| 7,671,982 B2 | 3/2010 | Wolters et al. |
| 7,787,114 B2 | 8/2010 | Wolters et al. |
| 7,952,083 B2 | 5/2011 | Shichi et al. |
| 8,194,240 B1 | 6/2012 | Vaez-Iravani et al. |
| 8,755,044 B2 | 6/2014 | Reich et al. |
| 8,885,158 B2 | 11/2014 | Wolters et al. |
| 9,116,132 B2 | 8/2015 | Wolters et al. |
| 9,255,891 B2 | 2/2016 | Wolters et al. |
| 9,390,887 B2 | 7/2016 | Plettner et al. |
| 9,739,719 B2 | 8/2017 | Fu et al. |
| 9,874,526 B2 | 1/2018 | Liu |
| 10,215,714 B1 | 2/2019 | Wu et al. |
| 2003/0103203 A1 | 6/2003 | Isozuki et al. |
| 2004/0076322 A1 | 4/2004 | Guetta |
| 2004/0263835 A1 | 12/2004 | Miyakawa et al. |
| 2005/0170569 A1 | 8/2005 | Yazaki et al. |
| 2006/0103856 A1 | 5/2006 | Miyakawa et al. |
| 2006/0256325 A1 | 11/2006 | Mcmillan et al. |
| 2008/0159112 A1 | 7/2008 | Van Der Lee et al. |
| 2009/0224180 A1 | 9/2009 | Aigner |
| 2009/0225399 A1 | 9/2009 | Zhao et al. |
| 2009/0299655 A1 | 12/2009 | Biellak et al. |
| 2010/0093112 A1 | 4/2010 | Takagi et al. |
| 2010/0195097 A1 | 8/2010 | Wenz |
| 2010/0274392 A1 | 10/2010 | Igari et al. |
| 2012/0314211 A1 | 12/2012 | Ando et al. |
| 2013/0010306 A1 * | 1/2013 | Coene .................... G03F 7/706 356/508 |
| 2013/0016346 A1 | 1/2013 | Romanovsky et al. |
| 2015/0204729 A1 * | 7/2015 | Kusunose ............... G03F 1/84 356/521 |
| 2016/0011523 A1 | 1/2016 | Singh et al. |
| 2018/0088469 A1 | 3/2018 | Otani |
| 2018/0188188 A1 | 7/2018 | Zhao |

* cited by examiner

METHODS AND SYSTEMS FOR OPTICAL SURFACE DEFECT MATERIAL CHARACTERIZATION

CROSS REFERENCE TO RELATED APPLICATION

The present application for patent claims priority under 35 U.S.C. § 119 from U.S. provisional patent application Ser. No. 62/871,872 entitled "Method Of Defect Material Characterization Using Optical Microscope," filed Jul. 9, 2019, the subject matter of which is incorporated herein by reference in its entirety.

TECHNICAL FIELD

The described embodiments relate to systems for surface inspection, and more particularly to semiconductor wafer inspection modalities.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Semiconductor fabrication environments are carefully controlled to minimize contamination of wafers. Unwanted material particles interfere with fabrication processes, degrade the performance of fabricated devices, or both. As semiconductor design rules continue to evolve, the requirements on uniformity and cleanliness of substrates continue to tighten. The allowable number of defects and maximum allowable particle size scale with the size of the devices under fabrication.

In general, inspection systems detect any type of defect on a sample at any point in a production process. In some examples, inspection systems are commonly employed to locate defects on a substrate prior to processing to ensure the substrate is suitable for continued manufacture or to identify defect sites on wafers prior to production. One such inspection system is an optical surface inspection system that illuminates and inspects a wafer surface for undesired particles. Optical surface inspection systems are typically high-throughput systems that locate defects and generate a map of defects located on each inspected wafer.

In addition, it is often desirable to classify defects by material type, structural characteristics, etc. Typically, a separate defect review tool is employed to perform defect classification tasks. In some examples, defects are located by an optical inspection tool. The inspected wafer and the map of defect locations are transferred to a defect review tool. The defect review tool performs a detailed analysis of one or more of the defect locations identified by the optical inspection system to classify the defect at each location.

Defects are often classified by material composition. In one example, knowledge of the defect material composition enables an operator to determine appropriate cleaning procedures to rid the wafer of defect particles. In another example, knowledge of the defect material composition indicates the source of wafer contamination, thus enabling the operator to take action to stop further wafer contamination.

Traditional defect classification tools and techniques are limited in sensitivity to small particle sizes, throughput, or both. For example, Energy-Dispersive X-Ray Spectrometry (EDX) provides defect material analysis capability at high sensitivity for some materials, but not for other materials such as inorganic compounds or organic particles. In addition, EDX suffers from insufficient throughput for cost effective defect classification in a semiconductor fabrication facility.

To increase throughput, it is desirable to perform at least some defect classification tasks with the same optical inspection tool employed to detect the location of defects. In particular, performing defect composition analysis with an optical inspection tool conveys significant advantages compared to traditional analysis tools employing EDX or Secondary-Ion Mass Spectrometry (SIMS) techniques. Performing defect classification with an optical inspection tool eliminates the need to transfer a wafer and defect map to another tool for defect classification. In addition, the defect classification results are available immediately from the optical inspection tool. In a typical semiconductor device manufacturing process, this reduces turnaround time from a few hours to a few minutes. In addition, defect classification with an optical inspection tool is non-destructive; the analysis is performed without destroying the sample, removing materials from the sample, etc.

U.S. Patent Publication No. 2018/0188188 by Zhao et al., and assigned to KLA Corporation, describes various optical inspection systems that detect and classify defects with sufficient sensitivity to small particle sizes at high throughput, the contents of which are incorporated herein by reference in their entirety. In particular, Zhao describes optical inspection systems employing a phase shifting phase contrast imaging technique to classify defects. The phase shifting phase contrast technique requires spatial separation of specularly reflected light and scattered light at a collection pupil plane of the optical system to introduce a relative phase shift between the specularly reflected light and the scattered light. To achieve this spatial separation, the distribution of the illumination beam is limited to selected location within the pupil plane of the objective lens. This limits the number of photons provided to the wafer by the illumination source, which in turn, limits the sensitivity of the optical inspection system.

As semiconductor design rules continue to evolve, the minimum particle size that must be detected by a surface inspection system continues to shrink in size. In addition, it is desirable to classify the detected defects with the same optical tool employed to detect the defects. Steady decreases in the size of fabricated features and the desire to simultaneously detect and classify defects presents challenges for sensitivity and throughput of inspection systems.

Improvements to optical surface inspection systems are desired to detect and classify defects in the inspection path of an illumination spot on a wafer surface with greater sensitivity and throughput.

SUMMARY

Methods and systems for detecting and classifying defects based on the phase of dark field scattering from a sample are described herein. In some embodiments, throughput is increased by detecting and classifying defects with the same optical system, i.e., defect inspection and defect review performed by the same optical tool. In other embodiments, optical inspection and optical review tools are enhanced by incorporating the techniques described herein.

In one aspect, a defect is classified based on the measured relative phase of scattered light collected from at least two spatially distinct locations in the collection pupil. In particular, the defect classification is based on the measured relative phase of scattered light for a given illumination angle. Thus, the techniques described herein are implemented in the collection optics of an inspection system only; resulting in a simple and cost effective optical inspection/ defect review system. Scattered light is collected from at least two spatially distinct locations in the collection pupil, while the remaining light is blocked. Under these conditions, a well-defined interference pattern is formed at the image plane at the photosensitive surface of the detector. The phase difference, if any, between the light transmitted through the two spatially distinct locations at the pupil plane is determined from the positions of the interference fringes in the imaging plane. The measured phase difference is indicative of the material composition of the measured sample.

In a further aspect, a difference between the measured phase difference and a known value of phase difference associated with the specimen is determined as a correction value. In some embodiments, the material under measurement is a known material having known material properties and phase response. In these embodiments, the difference between the phase difference measured by an inspection system and the known phase difference is indicative of systematic errors in the measurement system, e.g., optical aberration, measurement electronics errors, etc. The correction value is stored in memory. Subsequent measurements of phase difference performed by the system are corrected by the stored correction value to compensate for the systematic errors present in the measurement of phase difference.

In another aspect, phase difference information is extracted from the interference patterns present in detected images using a Fast Fourier Transform (FFT) algorithm. The FFT algorithm provides excellent noise rejection and is computationally efficient. In other examples, an iterative fit of a physical model of the measurement to a measured interference pattern is employed to determine the phase difference between the light scattered from two different locations in the pupil plane.

In another aspect, an inspection system includes a programmable pupil aperture device configured to sample the pupil at different, programmable locations in the collection pupil. In this manner, the location of each sampling position in the pupil plane is controlled for each phase difference measurement.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for detecting and classifying defects based on the phase of dark field scattering from a sample are described herein. In some embodiments, nanometer scale defect particles are detected and classified in accordance with the methods and systems described herein. The methods and systems for detecting and classifying defects presented herein are non-destructive and can be integrated into an optical inspection tool, a defect review tool, or an integrated optical inspection/defect review tool. In some embodiments, throughput is increased by detecting and classifying defects with the same optical system, i.e., defect inspection and defect review performed by the same optical tool. In other embodiments, optical inspection and optical review tools are enhanced by incorporating the techniques described herein.

In general, light scattering from a defect depends on many properties of the defect. For example, geometric properties such as defect shape and size affect light scattering, in addition to material properties such as the complex index of refraction described by the refractive index, n, and the extinction coefficient, k. Values of material parameters, such as n and k, indicate material composition. However, material parameters, such as n and k cannot be directly determined from a simple scattering light intensity measurement because they are not effectively decoupled from geometric properties in the light intensity measurement.

In one aspect, a defect is classified based on the measured relative phase of scattered light collected from at least two spatially distinct locations in the collection pupil. In particular, the defect classification is based on the measured relative phase of scattered light for a given illumination angle. Thus, the techniques described herein are implemented in the collection optics of an inspection system only; resulting in a simple and cost effective optical inspection/defect review system.

In one example, a defect particle is classified either as a high-K metal or a low-K, transparent dielectric material based on the measured relative phase of scattered light at different locations in the pupil plane.

In some examples, values of material properties of a defect, such as n and k, are determined based on the phase of light scattered from a defect. In particular, material properties are determined based on the measured phase difference of scattered light at different locations in the pupil plane. In these examples, a defect is classified based on the determined material properties of the defect.

Figure 1:
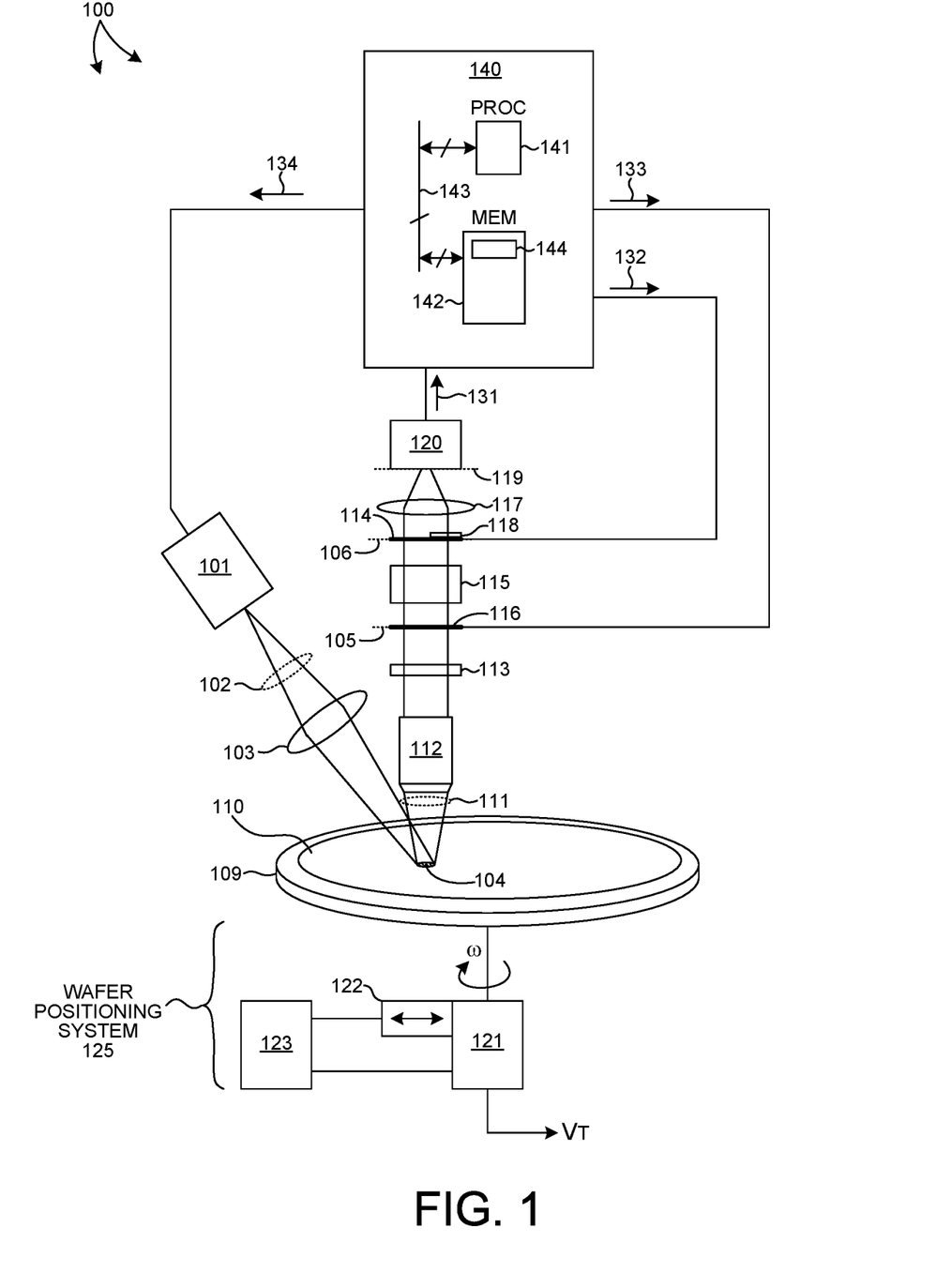
FIG. 1 is a simplified diagram illustrative of one embodiment of an inspection system configured to measure phase difference between scattered light collected from a specimen at distinct locations in the collection pupil.

FIG. 1 is a simplified schematic view of one embodiment of a surface inspection system 100 with inspection and classification functionality as described herein. Surface inspection system 100 is provided by way of non-limiting example. In general, any optical microscope or inspection system that images scattered light on a sensor to form an image of a defect as described herein is suitable for implementation of the inspection and classification functionality described herein. Such an optical microscope or inspection subsystem may be implemented as part of a bench-top analytical tool or as part of an automated system for defect inspection, defect review, or both.

For simplification, some optical components of the system have been omitted. By way of example, folding mirrors, polarizers, beam forming optics, additional light sources, additional collectors, and additional detectors may also be included. All such variations are within the scope of the invention described herein. The inspection system described herein may be used for inspecting unpatterned, as well as patterned wafers.

As illustrated in FIG. 1, an illumination source 101 generates a beam of illumination light 102 directed toward wafer 110. In the embodiment depicted in FIG. 1, focusing optics 103 focus illumination light 102 onto wafer 110 over measurement spot 104. However, in general, any suitable illumination optical elements may employed to provide illumination light 102 onto wafer 110 over a desired measurement spot size. In some embodiments, one or more beam shaping elements are included in the illumination optical path (i.e., the optical path between illumination source 101 and wafer 110) to form a desired beam profile. Exemplary beam profiles include a Gaussian beam shape, a ring beam shape, a flat-top beam shape, etc. Typical measurement spot sizes include measurement spots characterized by a dimension of longest extent across the measurement spot having a length as small as one micrometer to as large as five hundred micrometers.

In some embodiments, one or more polarizer elements are located in the illumination optical path to polarize the illumination light in a desired manner. Exemplary polarizations include linear polarization, elliptical polarization, circular polarization, or no polarization.

As depicted in FIG. 1, illumination 102 is provided to the surface of wafer 110 at an oblique angle by the illumination subsystem. However, in general, the illumination subsystem may be configured to direct the beam of light to the specimen at a normal angle of incidence. Typical incidence angles range from zero degrees (normal incidence) to eighty degrees from normal incidence. In some embodiments, system 100 may be configured to direct multiple beams of light to the specimen at different angles of incidence, such as an oblique angle and a normal angle of incidence. The multiple beams of light may be directed to the specimen substantially simultaneously or sequentially.

Illumination source 101 may include, by way of example, a laser, a diode laser, a helium neon laser, an argon laser, a solid state laser, a diode pumped solid state (DPSS) laser, a xenon arc lamp, a gas discharging lamp, and LED array, or an incandescent lamp. The light source may be configured to emit near monochromatic light or broadband light. In some embodiments, the illumination subsystem is configured to direct light having a relatively narrow wavelength band to the specimen (e.g., nearly monochromatic light or light having a wavelength range of less than about 20 nm, less than about 10 nm, less than about 5 nm, or even less than about 2 nm) for an interval of time. Therefore, if the light source is a broadband light source, the illumination subsystem may also include one or more spectral filters that may limit the wavelength of the light directed to the specimen. The one or more spectral filters may be bandpass filters and/or edge filters and/or notch filters. In some examples, the wavelengths of light incident on wafer 110 include any subset of wavelengths ranging from infrared to extreme ultraviolet. In general, illumination source 101 emits radiation at any desired wavelength or range of wavelengths of light within the optical wavelength range.

In the embodiment depicted in FIG. 1, illumination source 101 is configured to control the optical power of the beam of illumination light 102 in accordance with command signal 134 received from computing system 140. In one embodiment, illumination source 101 dynamically adjusts the illumination power during a surface inspection scan.

Figure 2:
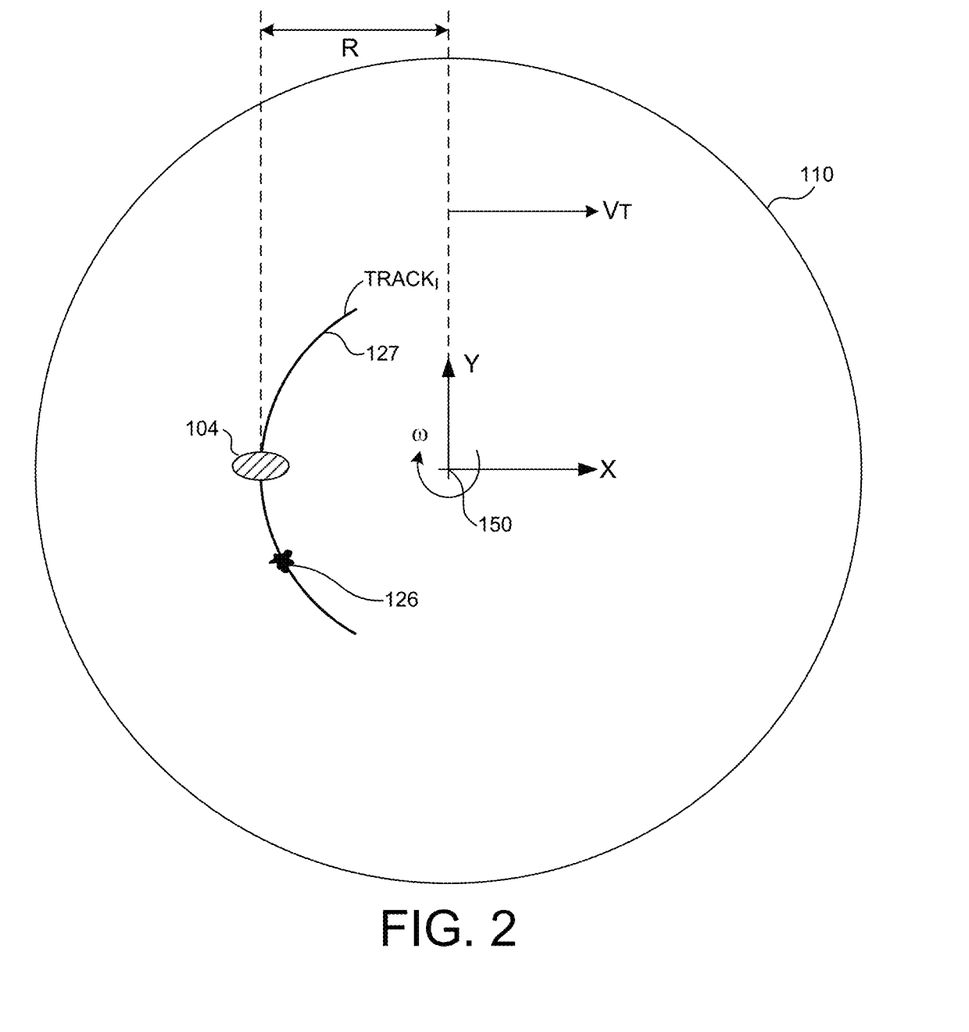
FIG. 2 is a simplified diagram illustrative of a wafer 110 illuminated by an illumination beam.

In the embodiment illustrated in FIG. 1, wafer positioning system 125 moves wafer 110 under measurement spot 104. Wafer positioning system 125 includes a wafer chuck 109, motion controller 123, a rotation stage 121 and a translation stage 122. Wafer 110 is supported on wafer chuck 109. As illustrated in FIG. 2, wafer 110 is located with its geometric center 150 approximately aligned with the axis of rotation of rotation stage 121. In this manner, rotation stage 121 spins wafer 110 about its geometric center at a specified angular velocity, w, within an acceptable tolerance. In addition, translation stage 122 translates the wafer 110 in a direction approximately perpendicular to the axis of rotation of rotation stage 121 at a specified velocity, $V_T$. Motion controller 123 coordinates the spinning of wafer 110 by rotation stage 121 and the translation of wafer 110 by translation stage 122 to achieve the desired scanning motion of wafer 110 within inspection system 100.

In an exemplary operational scenario, inspection begins with measurement spot 104 located at the geometric center 150 of wafer 110 and then wafer 110 is rotated and translated until measurement spot 104 reach the outer perimeter of wafer 110 (i.e., when R equals the radius of wafer 110). Due to the coordinated motion of rotation stage 121 and translation stage 122, the locus of points illuminated by measurement spot 104 traces a spiral path on the surface of wafer 110. The spiral path on the surface of wafer 110 is referred to as an inspection track 127 (not shown in its entirety). A portion of an exemplary inspection track 127 is illustrated in FIG. 2 as $TRACK_i$. As illustrated in FIG. 2, measurement spot 104 is located a distance, R, from the geometric center of wafer 110, and defect particle 126 is approaching measurement spot 104. In some embodiments, inspection system 100 is able to locate a defect particle as small as 50 nanometers along a dimension of maximum extent of the particle. In some embodiments, inspection system 100 is able to locate a defect particle as small as 10 nanometers along a dimension of maximum extent of the particle.

As depicted in FIG. 1, inspection system 100 includes an imaging collection objective 112 employed to image the light 111 scattered and/or reflected from wafer 110 over a range of collection angles at measurement spot 104 onto one or more wafer image planes of the collection optics subsystem (e.g., image plane 119). Objective 112 is configured to collect dark field scattering light. In some embodiments, objective 112 captures scattered light with a Numerical Aperture (NA) of 0.1 to 0.99.

Although a particular, nominal orientation of collection objective 112 is illustrated in FIG. 1, it is understood that the orientation of the collection objective with respect to the wafer surface may be arranged appropriately depending upon, for example, the angle of incidence and/or topographical characteristics of the wafer.

In some embodiments, the collection optical path (i.e., the optical path between wafer 110 and detector 120) includes one or more polarizer optical elements 113 to select light having desired polarization. In some embodiments the one or more polarizer elements 113 include a simple polarizer. In some other embodiments, the one or more polarizer elements 113 include a phase plate combined with a polarizer. In some of these embodiments, the phase plate is designed to alter the polarization of scattering light.

In some embodiments, the collection optical path includes one or more pupil relay optics (e.g., pupil relay optics 115) to form one or more relayed pupil planes (e.g., pupil plane 106). This may be desirable to permit easier access to a collection pupil plane for one or more light modification elements (e.g., mask elements) to control the amount of light collected from specific regions of the pupil as described herein. Alternatively, it may be desirable to locate all light modification elements (e.g., mask elements) that control the amount of light collected from specific regions of the pupil as described herein at or near one pupil plane. As depicted in FIG. 1, the collection optical path includes two pupil planes (e.g., pupil planes 105 and 106), and pupil mask 114 is located at pupil plane 106.

In the embodiment depicted in FIG. 1, optical elements 117 focus the collected light 111 onto the image plane 119, where the image is detected by detector 120.

Imaging detector 120 generally functions to convert the detected light into electrical signals indicative of the detected image of the wafer 110 within the detected field of view. In general, imaging detector 120 may include substantially any photodetector known in the art. However, a particular detector may be selected for use within one or more embodiments of the invention based on desired performance characteristics of the detector, the type of specimen to be inspected, and the configuration of the illumination. In general, detector 120 acquires image information in a frame mode or a scanning mode. In a scanning mode, the image is collected while wafer 110 is moving. If the amount of light available for inspection is relatively low, an efficiency enhancing detector such as a time delay integration (TDI) camera may employed to increase the signal-to-noise ratio and throughput of the system. In another example, signal integration is employed to achieve sufficient SNR for phase measurement. Depending on available signal, the integration time may be selected from a few nanoseconds to a second. The downside of a lengthy integration time is long measurement time and susceptibility to environmental disturbances such as machine vibrations, etc. Other detectors such as charge-coupled device (CCD) cameras, arrays of photodiodes, phototubes and photomultiplier tubes (PMTS), or an individual PMT/photodiode with a scannable aperture in front of the detector may be used, depending on the amount of light available for inspection and the type of inspection being performed.

Imaging detector 120 may be implemented in various imaging modes, such as bright field, dark field, and confocal. Various imaging modes such as bright field, dark field, and phase contrast can be implemented by using different apertures or Fourier filters. U.S. Pat. Nos. 7,295,303 and 7,130,039, which are incorporated by reference herein, describe these imaging modes in further detail. In the depicted example, detector 120 generates dark field images by imaging scattered light collected at larger field angles. In another example, a pinhole that matches the incident spot 104 can be placed in front of a detector (e.g., detector 120) to generate a confocal image. U.S. Pat. No. 6,208,411, which is incorporated by reference herein, describes these imaging modes in further detail. In addition, various aspects of surface inspection system 100 are described in U.S. Pat. Nos. 6,271,916 and 6,201,601, both of which are incorporated herein by reference.

In a further aspect, computing system 140 is configured to determine the location of a defect in the scan path based on changes in the detected signals 131. In addition, computing system 140 is configured to classify the defect based on its material characteristics as described herein.

In one aspect, scattered light is collected from at least two spatially distinct locations in the collection pupil, while the remaining light is blocked. Under these conditions, a well-defined interference pattern is formed at the image plane at the photosensitive surface of the detector. The phase difference, if any, between the light transmitted through the two spatially distinct locations at the pupil plane is determined from the positions of the interference fringes in the imaging plane. The measured phase difference is indicative of the material composition of the measured sample.

In a further aspect, a difference between the measured phase difference and a known value of phase difference associated with the specimen is determined by computing system 140 as a correction value. In some embodiments, the material under measurement (i.e., within the measurement spot 104) is a known material having known material properties and phase response. In these embodiments, the difference between the phase difference measured by an inspection system (e.g., inspection system 100) and the known phase difference is indicative of systematic errors in the measurement system, e.g., optical aberration, measurement electronics errors, etc. The correction value is stored in memory (e.g., memory 142). Subsequent measurements of phase difference performed by the system are corrected by the stored correction value to compensate for the systematic errors present in the measurement of phase difference. The correction value is valid for measurements performed by the inspection system using the mask arrangement employed to perform the calibration measurement (i.e., the specific locations in the pupil sampled during the calibration measurement). Additional calibration measurements can be made for different mask arrangements as described herein to determine correction factors for each set of sampling locations.

Figure 3:
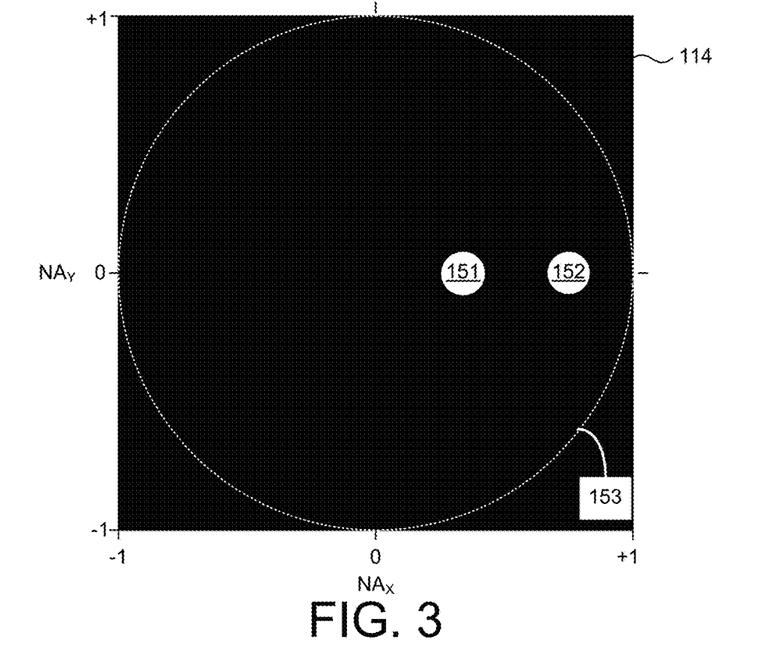
FIG. 3 is a diagram illustrative of a mask that blocks light at all collected NA, except light that is transmitted through an aperture.

As depicted in FIG. 1, mask 114 is located at pupil plane 106. Alternatively, mask 114 may be located at pupil plane 105. Whether a mask is located a one pupil plane or another is a matter of design preference, and all alternatives are contemplated within the scope of this patent document. FIG. 3 depicts an illustration of mask 114. As depicted in FIG. 3, mask 114 blocks light at all collected NA, except light that is transmitted through apertures 151 and 152. In the embodiment depicted in FIG. 3, the center of aperture 151 is located at 0.358 $NA_x$ and 0.0 $NA_y$ (corresponds to an angle of incidence of 21 degrees at the wafer). The radius of aperture 151 is 1/12 of the radius of the pupil 153. The center of aperture 152 is located at 0.788 $NA_x$ and 0.0 $NA_y$ (corresponds to an angle of incidence of 52 degrees at the wafer). The radius of aperture 152 is 1/12 of the radius of the pupil 153. Whether all apertures are located at a single pupil plane, or at different pupil planes is a matter of design preference, and all alternatives are contemplated within the scope of this patent document.

Figure 4:
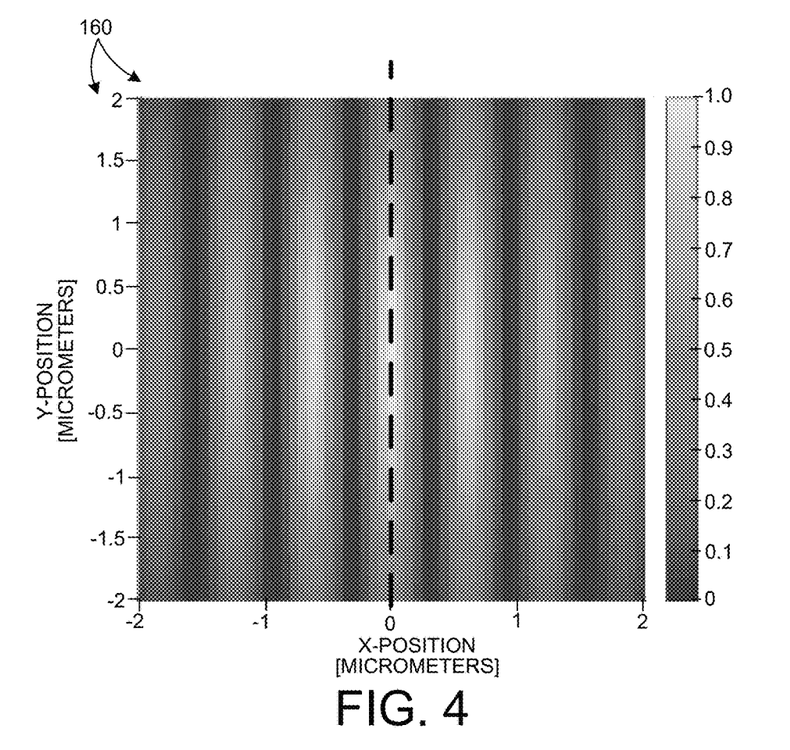
FIG. 4 depicts a plot of a simulation of an interference pattern at an image plane generated by the interference of light scattered from a material and transmitted through apertures at different locations in the collection pupil.

FIG. 4 depicts a plot 160 of a simulation of the interference pattern at the image plane at the photosensitive surface of detector 120 generated by the interference of light transmitted through apertures 151 and 152. In this example, detector 120 includes a 973×973 array of 70 micrometer square pixels, and the illumination light has a wavelength of 266 nanometers. FIG. 4 illustrates a zoomed view of the image plane at the center of the measurement spot. As illustrated in FIG. 4, the interference fringes are centered at the center position of the image, i.e., (X,Y)=(0,0). Thus, in this example, the scattered light collected from the sample material and transmitted through aperture 151 has the same phase as the scattered light collected from the sample material and transmitted through aperture 152, i.e., zero phase difference.

Figure 5:
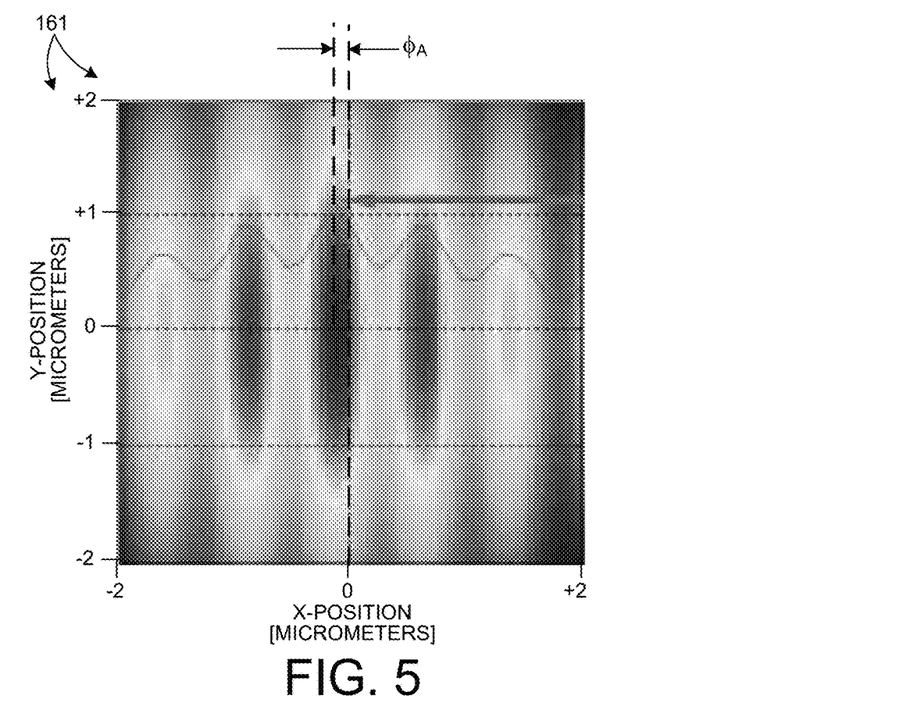
FIG. 5 depicts a plot of a simulation of an interference pattern at the image plane generated by the interference of light scattered from a different material than the material depicted in FIG. 4 and transmitted through the same apertures as depicted in FIG. 4.

FIG. 5 depicts a plot 161 of another simulation of the interference pattern at the image plane at the photosensitive surface of detector 120 generated by the interference of light transmitted through apertures 151 and 152 from a different material than FIG. 4. FIG. 5 illustrates a zoomed view of the image plane at the center of the measurement spot. As illustrated in FIG. 5, the interference fringes are not centered at the center position of the image, i.e., (X,Y)=(0,0). Thus, in this example, the scattered light collected from the sample material and transmitted through aperture 151 has different phase than the scattered light collected from the sample material and transmitted through aperture 152. In this example, the phase difference is characterized by the angle, $\phi_A$.

Figure 6:
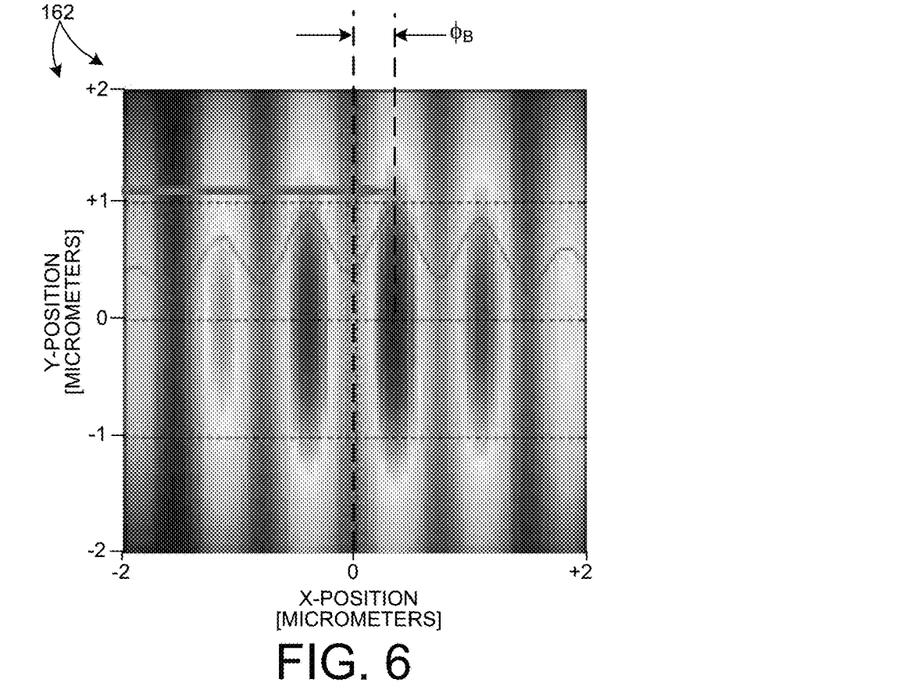
FIG. 6 depicts a plot of a simulation of an interference pattern at the image plane generated by the interference of light scattered from a different material than the materials depicted in FIGS. 4 and 5, and transmitted through the same apertures as depicted in FIG. 4.

FIG. 6 depicts a plot 162 of another simulation of the interference pattern at the image plane at the photosensitive surface of detector 120 generated by the interference of light transmitted through apertures 151 and 152 from another different material than FIG. 4. FIG. 6 illustrates a zoomed view of the image plane at the center of the measurement spot. As illustrated in FIG. 6, the interference fringes are not centered at the center position of the image, i.e., (X,Y)=(0,0). Thus, in this example, the scattered light collected from the sample material and transmitted through aperture 151 has different phase than the scattered light collected from the sample material and transmitted through aperture 152. In this example, the phase difference is characterized by the angle, $\phi_B$.

As depicted in FIGS. 5 and 6, each measured material exhibits a phase difference between the scattered light collected from the sample material and transmitted through aperture 151 and the scattered light collected from the sample material and transmitted through aperture 152. Most importantly, the phase difference associated with each material is dramatically different. For example, as depicted in FIGS. 5 and 6, the difference in phase difference, characterized by the difference between $\phi_A$ and $\phi_B$ is approximately 0.6 multiplied by the spatial period of the interference fringes (i.e., approximately 200 degrees). As a result, the value of phase difference, i.e., the relative phase between two different locations in the pupil plane, corresponding to two different materials is indicative of a difference in optical properties (e.g., n and k values) between the materials.

The specific locations and sizes of apertures 151 and 152 are provided by way of non-limiting example. In general, many different aperture sizes and locations may be contemplated within the scope of this patent document. For example, each aperture in the pupil plane may be sized in range from 0.01 NA to 0.3 NA.

In general, the value of phase difference measured using a particular mask geometry does not uniquely identify the material composition of the measured sample, although it may in some cases. To distinguish materials with high confidence, the value of phase difference may be measured using a number of different mask geometries, i.e., measure the phase differences associated with multiple sets of different locations in the pupil plane. If the number of different mask geometries is sufficiently large, a map of phase in the pupil plane may be derived from the measured interference fringes associated with each of the difference mask geometries. This phase map is then used to uniquely identify the material properties of the measured sample, e.g., n and k. In one example, the values of material parameters, e.g., n and k, are floated in physical model of the material and an iterative fitting procedure is employed to estimate values of the material parameters that best fit the measured phase map.

The inventors have discovered that useful material characterization information can be derived from phase difference measurements of a sample with as few as two different mask geometries. In some examples, phase difference measurements of a defect particle with two different mask geometries are sufficient to classify the measured particle as a metal (very large k value) or a non-metal (a very small or zero k value) with accuracy greater than 90%.

In another aspect, computing system 140 is configured to extract phase difference information from the interference patterns present in images 131 detected by detector 120. In some examples, a Fast Fourier Transform (FFT) algorithm is employed to determine the phase difference between the light scattered from two different locations in the pupil plane based on the measured interference patterns. The FFT algorithm provides excellent noise rejection and is computationally efficient. In other examples, an iterative fit of a physical model of the measurement to a measured interference pattern is employed to determine the phase difference between the light scattered from two different locations in the pupil plane. In this example, one or more parameters indicative of the phase difference are floated in the physical model, and the values are estimated in an iterative manner.

In some embodiments, the location of apertures located in the pupil plane is optimized to enhance the contrast between phase differences measured for different materials. For example, if the spacing between apertures in the pupil plane is too large, the measured phase difference will look similar for many different materials. However, if the spacing between apertures in the pupil plane is too small, the value of measured phase difference will suffer from low signal to noise ratio. In many examples, the spacing between apertures is informed by knowledge of the phase map associated with each material of interest. For example, if it is known that a large transition in phase difference occurs over a particular range of NA, the spacing of the apertures is selected to just span the range of NA where the transition is known to occur. In some examples, a spatial separation between the apertures in the pupil plane spans a range of NA from 0.1 to 0.9.

Figure 7:
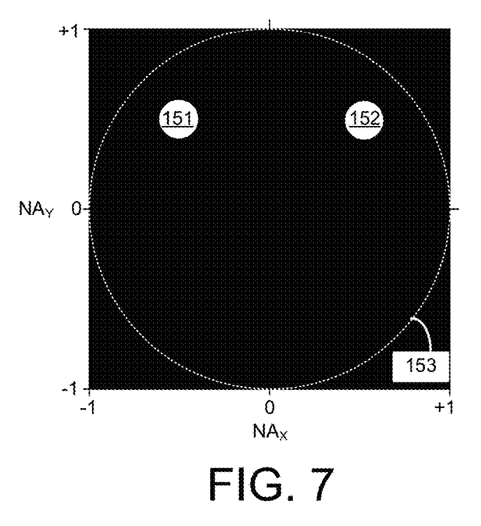
FIG. 7 depicts a diagram illustrative of pupil apertures located symmetrically about the center of the pupil in the x-direction in one embodiment.
Figure 8:
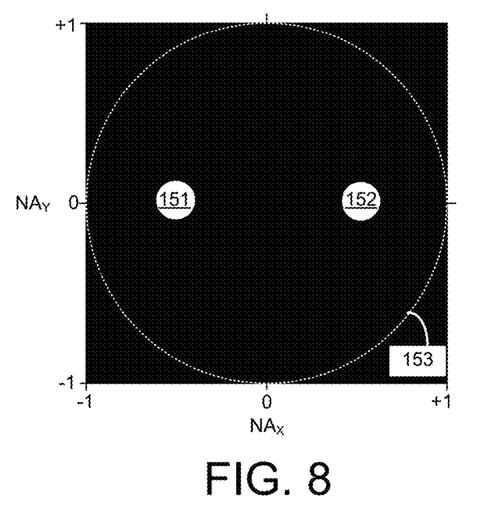
FIG. 8 depicts a diagram illustrative of pupil apertures located symmetrically about the center of the pupil in the x-direction in another embodiment.
Figure 9:
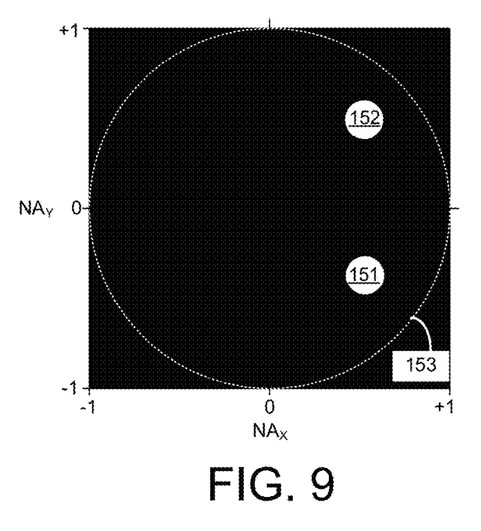
FIG. 9 depicts a diagram illustrative of pupil apertures located symmetrically about the center of the pupil in the y-direction in one embodiment.
Figure 10:
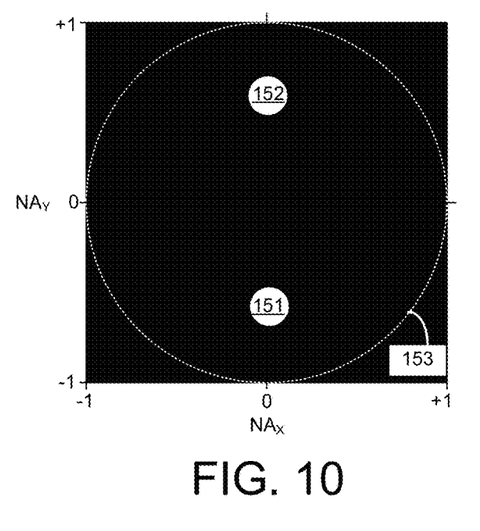
FIG. 10 depicts a diagram illustrative of pupil apertures located symmetrically about the center of the pupil in the y-direction in another embodiment.

In other embodiments, the aperture locations are selected to minimize measurement errors induced by focus offset (i.e., focus errors) of the inspection tool. The characterization of materials by phase difference in the collection pupil as described herein is relatively insensitive to focus offsets. However, the sensitivity of the measurement of phase difference to focus offset does depend on the locations of the different apertures. In some examples, the apertures are symmetrically located about the center of the pupil to minimize measurement sensitivity to focus offset. FIGS. 7 and 8 depict different locations of apertures 151 and 152 that are symmetric about the center of the pupil in the x-direction. FIGS. 9 and 10 depict different locations of apertures 151 and 152 that are symmetric about the center of the pupil in the y-direction.

In some embodiments, the size of apertures located in the pupil plane is optimized to both enhance the contrast between phase differences measured for different materials and minimize the time necessary for data collection, particularly for particles smaller than 100 nanometers. If the aperture size is too small, very little light is transmitted. This requires signal integration over long acquisition times to achieve sufficient signal to noise ratio. However, if the aperture size is too large, it becomes difficult to distinguish the phase differences associated with different materials because light from too much of the pupil is measured. In some embodiments, the aperture size is in a range from 0.01 NA to 0.3 NA.

Although the calculation of phase difference between two different locations in the pupil plane is discussed hereinbefore, in general, the phase difference may be calculated among more than two locations (e.g., three or more locations). Estimating phase difference among more than two locations shortens acquisition time, but requires a more computationally complex determination of phase.

The characterization of material properties based on measured phase differences associated with different locations in the pupil plane relies on the non-uniformity of phase of scattered light in the pupil plane. However, in addition, the intensity of light scattering in the pupil plane may also be very non-uniform. If intensity differences are sufficiently large, the contrast of the interference fringes is significantly reduced and the resolution of the phase measurement suffers. In some embodiments, this limitation is overcome by attenuating the transmitted light from one aperture relative to another aperture. In some embodiments, a neutral density filter, a smaller aperture size, or a combination of both, are employed to attenuate the intensity of transmitted light through one aperture relative to another aperture. FIG. 1 depicts a neutral density filter 118 at pupil plane 106 that spans aperture 152, but not aperture 151. In this manner, the intensity of light transmitted through aperture 152 that reaches detector 120 is attenuated relative to the intensity of light transmitted through aperture 151 that reaches detector 120.

As described hereinbefore, in some examples, two or more different locations of sampling positions in the pupil are required to classify a defect. In addition, optimal sampling locations in the pupil vary depending on the material under consideration.

In another aspect, an inspection system includes a programmable pupil aperture device configured to sample the pupil at different locations under control of computing system 140. In this manner, computing system 140 controls the location of each sampling position in the pupil plane for each phase difference measurement.

Figure 11:
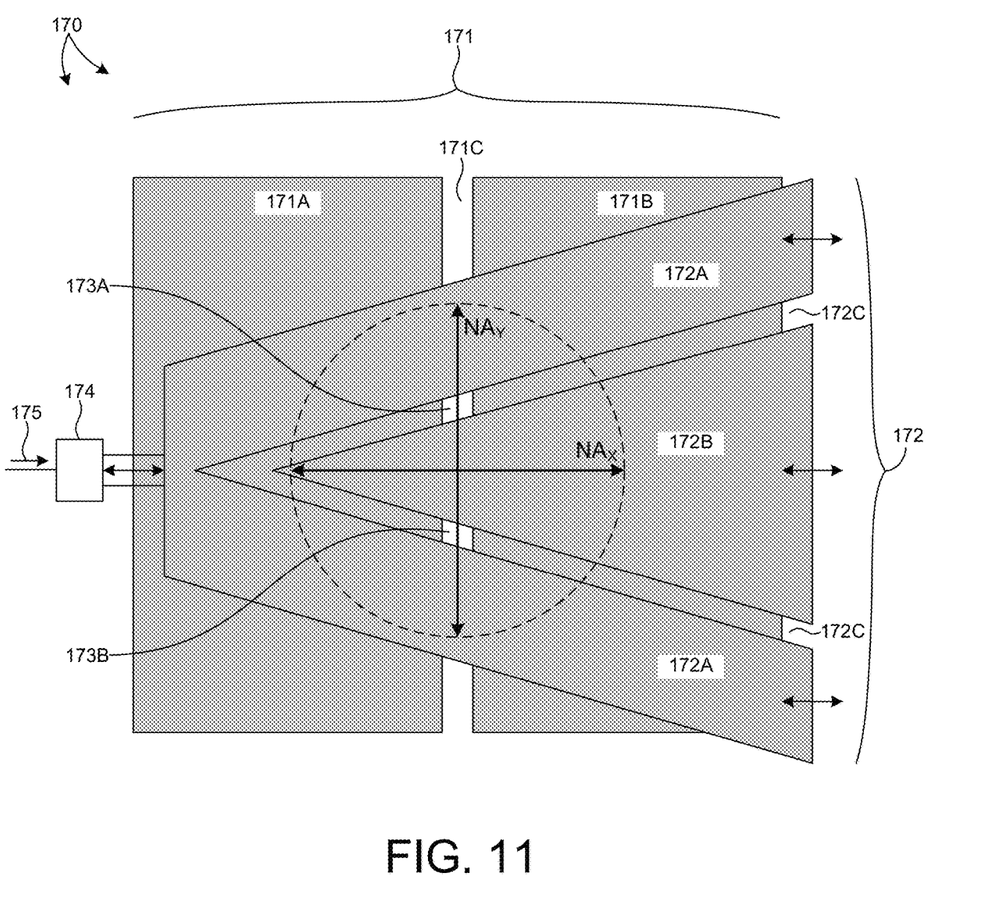
FIG. 11 is a simplified diagram illustrative of a programmable pupil mask device in one embodiment.

FIG. 11 depicts a programmable pupil mask device 170 in one embodiment. As depicted in FIG. 11, programmable pupil mask device 170 includes mask element 171 and mask element 172. Mask element 171 includes optical elements 171A and 171B that block collected light in the pupil. Optical elements 171A and 171B are fixed with respect to one another and are fixed in their position within the pupil. Optical elements 171A and 171B are spatially separated; revealing a linear, optically transparent slit 171C. Mask element 172 includes V-shaped optical elements 172A and 172B that block collected light in the pupil. Optical elements 172A and 172B are fixed with respect to one another and are spatially separated revealing a V-shaped optically transparent slit 172C. Mask element 172 is movable in the x-direction across the pupil. In addition, mask element 172 is coupled to actuator 174. Actuator 174 is communicatively coupled to a computing system, e.g., computing system 140. In one example, computing system 140 communicates control commands 175 to actuator 174 indicating a desired position of mask element 172 in the pupil. In response actuator 174 translates mask element 172 to the desired position in the pupil.

As depicted in FIG. 11, a movement of mask element 172 in the x-direction changes the separation distance between aperture openings 173A and 173B in the pupil through which light is transmitted to detector 120. In the embodiment depicted in FIG. 11, aperture openings 173A and 173B are symmetrical about the x-axis and the distance between them in the y-direction is determined by the x-position of mask element 172. In one embodiment mask element 171 is located at pupil plane 105 and mask element 172 is located at pupil plane 106 of inspection system 100 depicted in FIG. 1.

Figure 12:
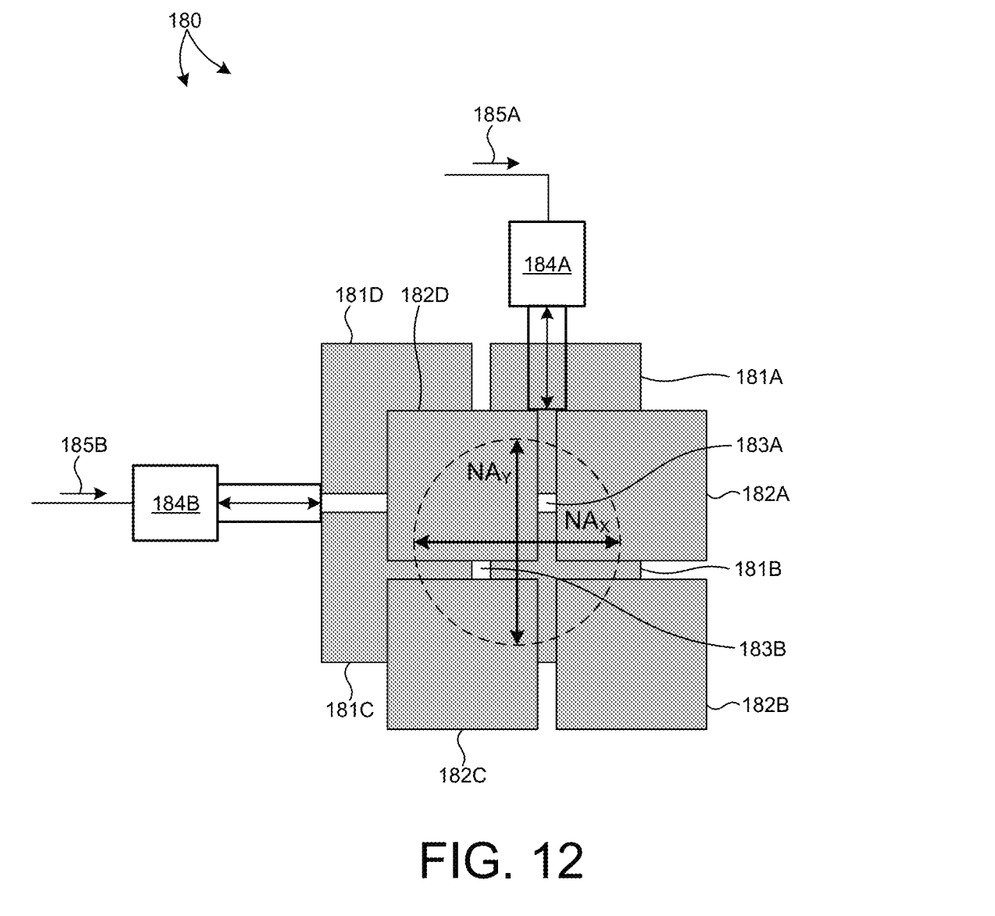
FIG. 12 is a simplified diagram illustrative of a programmable pupil mask device in another embodiment.

FIG. 12 depicts a programmable pupil mask device 180 in one embodiment. As depicted in FIG. 12, programmable pupil mask device 180 includes mask element 181 including optical elements 181A-D that block collected light in the pupil and mask element 182 including optical elements 182A-D that block collected light in the pupil. Optical elements 181A-D are fixed with respect to one another, and optical elements 182A-D are fixed with respect to one another. Optical elements 181A-D are spatially separated; revealing linear, optically transparent slits aligned with the x-direction and y-direction, respectively. Similarly, optical elements 182A-D are spatially separated; revealing linear, optically transparent slits aligned with the x-direction and y-direction, respectively.

Mask element 181 is movable in the x-direction across the pupil. In addition, mask element 181 is coupled to actuator 184B. Actuator 184B is communicatively coupled to a computing system, e.g., computing system 140. In one example, computing system 140 communicates control commands 185B to actuator 184B indicating a desired position of mask element 181 in the pupil. In response actuator 184B translates mask element 181 to the desired position in the pupil. Similarly, mask element 182 is movable in the y-direction across the pupil. In addition, mask element 182 is coupled to actuator 184A. Actuator 184A is communicatively coupled to a computing system, e.g., computing system 140. In one example, computing system 140 communicates control commands 185A to actuator 184A indicating a desired position of mask element 182 in the pupil. In response actuator 184A translates mask element 182 to the desired position in the pupil.

As depicted in FIG. 12, a movement of mask element 181 in the x-direction changes the location of aperture opening 183B in the x-direction without moving the location of aperture opening 183A. Similarly, a movement of mask element 182 in the y-direction changes the location of aperture opening 183B in the y-direction without moving the location of aperture opening 183A. In this manner, phase difference measurements between a number of different locations in the pupil and a fixed point in the pupil are made by adjusting the position of mask elements 181, 182, or both, between each measurement. In one embodiment mask element 181 is located at pupil plane 105 and mask element 182 is located at pupil plane 106 of inspection system 100 depicted in FIG. 1.

In some other embodiments, a programmable pupil mask device includes a number of different mask elements each having a fixed aperture pattern. The programmable pupil mask device includes an actuator subsystem (e.g. a linear translation stage, a rotational stage, etc.) to selectively locate a desired mask element in a desired location in a pupil plane. In one example, computing system 140 communicates a control command signal to the actuator subsystem. In response, the actuator subsystem locates a desired mask element in a desired location in a collection pupil plane of the optical system in accordance with the control command signal.

In general, computing system 140 is configured to detect features, defects, or light scattering properties of the wafer using electrical signals obtained from each detector. The computing system 140 may include any appropriate processor(s) known in the art. In addition, the computing system 140 may be configured to use any appropriate defect detection algorithm or method known in the art. For example, the computing system 140 may use a die-to-database comparison or a thresholding algorithm to detect defects on the specimen.

In addition, inspection system 100 may include peripheral devices useful to accept inputs from an operator (e.g., keyboard, mouse, touchscreen, etc.) and display outputs to the operator (e.g., display monitor). Input commands from an operator may be used by computing system 140 to adjust the sampling locations within the collection pupil. The resulting sampling locations may be graphically presented to an operator on a display monitor.

Inspection system 100 includes a processor 141 and an amount of computer readable memory 142. Processor 141 and memory 142 may communicate over bus 143. Memory 142 includes an amount of memory 144 that stores a program code that, when executed by processor 141, causes processor 141 to execute the defect detection and classification functionality described herein.

Figure 13:
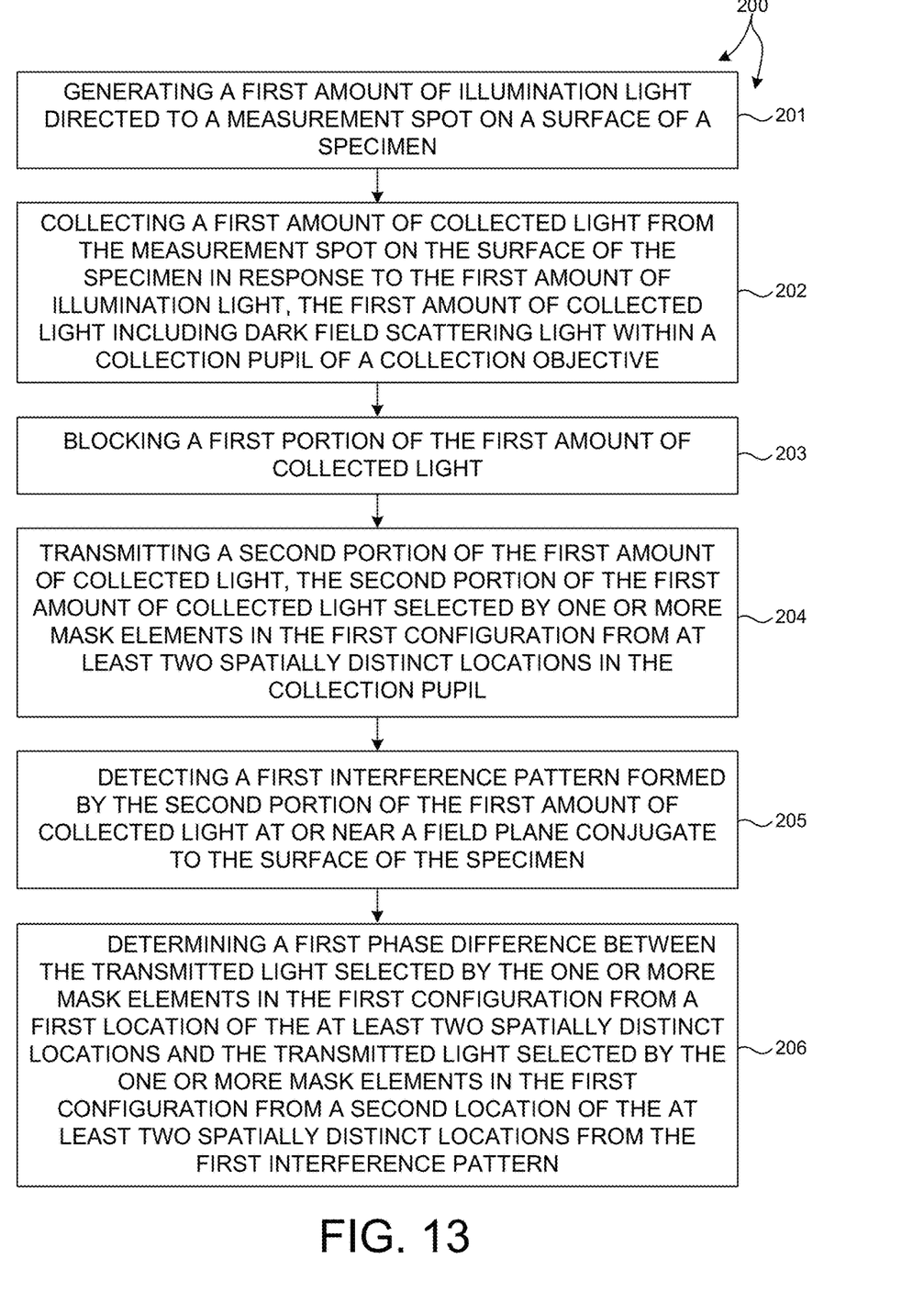
FIG. 13 illustrates a flowchart of an exemplary method 200 useful for measuring phase difference between scattered light collected from a specimen at distinct locations in the collection pupil.

FIG. 13 illustrates a flowchart of an exemplary method 200 useful for classifying defects. In some non-limiting examples, inspection system 100 described with reference to FIG. 1 is configured to implement method 200. However, in general, the implementation of method 200 is not limited by the specific embodiments described herein.

In block 201, a first amount of illumination light is generated by an illumination source and directed to a measurement spot on a surface of a specimen.

In block 202, a first amount of collected light is collected from the measurement spot on the surface of the specimen in response to the first amount of illumination light. The first amount of collected light includes dark field scattering light within a collection pupil of a collection objective.

In block 203, a first portion of the first amount of collected light is blocked.

In block 204, a second portion of the first amount of collected light is transmitted. The second portion of the first amount of collected light is selected by one or more mask elements in a first configuration. The first amount of collected light is selected from at least two spatially distinct locations in the collection pupil.

In block 205, a first interference pattern formed by the second portion of the first amount of collected light is detected at or near a field plane conjugate to the surface of the specimen.

In block 206, a first phase difference between the transmitted light selected by the one or more mask elements in the first configuration from a first location of the at least two spatially distinct locations and the transmitted light selected by the one or more mask elements in the first configuration from a second location of the at least two spatially distinct locations is determined from the first interference pattern.

Various embodiments are described herein for an inspection system or tool that may be used for inspecting a specimen. The term "specimen" is used herein to refer to a wafer, a reticle, or any other sample that may be inspected for defects, features, or other information (e.g., an amount of haze or film properties) known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blur racy disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. In one example, detector 120 can be replaced by a fiber array. In one example, inspection system 100 may include more than one light source (not shown). The light sources may be configured differently or the same. For example, the light sources may be configured to generate light having different characteristics that can be directed to a wafer at the same or different illumination areas at the same or different angles of incidence at the same or different times. The light sources may be configured according to any of the embodiments described herein. In addition one of the light sources may be configured according to any of the embodiments described herein, and another light source may be any other light source known in the art. In some embodiments, an inspection system may illuminate the wafer over more than one illumination area simultaneously. The multiple illumination areas may spatially overlap. The multiple illumination areas may be spatially distinct. In some embodiments, an inspection system may illuminate the wafer over more than one illumination area at different times. The different illumination areas may temporally overlap (i.e., simultaneously illuminated over some period of time). The different illumination areas may be temporally distinct. In general, the number of illumination areas may be arbitrary, and each illumination area may be of equal or different size, orientation, and angle of incidence. In yet another example, inspection system 100 may be a scanning spot system with one or more illumination areas that scan independently from any motion of wafer 110. In some embodiments an illumination area is made to scan in a repeated pattern along a scan line. The scan line may or may not align with the scan motion of wafer 110. Although as presented herein, wafer positioning system 125 generates motion of wafer 110 by coordinated rotational and translational movements, in yet another example, wafer positioning system 125 may generate motion of wafer 110 by coordinating two translational movements. For example, wafer positioning system 125 may generate motion along two orthogonal, linear axes (e.g., X-Y motion). In such embodiments, scan pitch may be defined as a distance between adjacent translational scans along either motion axis. In such embodiments, an inspection system includes an illumination source and a wafer positioning system. The illumination source supplies an amount of radiation to a surface of a wafer over an illumination area. The wafer positioning system moves the wafer in a scanning motion characterized by a scan pitch (e.g., scanning back and forth in one direction and stepping by an amount equal to the scan pitch in the orthogonal direction).

Accordingly, various modifications, adaptations, and combinations of various features of the described embodiments can be practiced without departing from the scope of the invention as set forth in the claims.

What is claimed is:

1. A system comprising:
   an illumination source configured to generate a first instance of illumination light and a second instance of illumination light directed to a defect of interest disposed on a specimen;
   a collection objective configured to collect a first amount of collected light from the defect of interest in response to the first instance of illumination light and a second amount of collected light from the defect of interest in response to the second instance of illumination light, the first and second amounts of collected light including dark field scattering light within a collection pupil of the collection objective;
   one or more mask elements disposed in a first configuration during the first instance and a second configuration during the second instance, the one or more mask elements in the first configuration transmit a portion of the first amount of collected light from at least two spatially distinct regions in the collection pupil, the one or more mask elements in the second configuration transmit a portion of the second amount of collected light from at least two spatially distinct regions in the collection pupil, wherein at least one of the at least two spatially distinct regions in the second configuration is different from at least one of the at least two spatially distinct regions in the first configuration;
   an imaging detector having a photosensitive surface located at or near a field plane conjugate to the surface of the specimen, the imaging detector configured to detect a first interference pattern formed by the transmitted portion of the first amount of collected light at or near the field plane and a second interference pattern formed by the transmitted portion of the second amount of collected light at or near the field plane; and
   one or more processors configured to:
      receive output signals indicative of the first and second interference pattern; and
      classify the defect of interest on the first and second interference patterns.

2. The system of claim 1, wherein the first interference pattern is indicative of a first phase difference between the transmitted light from a first region of the at least two spatially distinct regions in the first configuration and the transmitted light from a second region of the at least two spatially distinct locations in the first configuration, and wherein the second interference pattern is indicative of a second phase difference between the transmitted light from a first region of the at least two spatially distinct regions in the second configuration and the transmitted light from a second region of the at least two spatially distinct locations in the second configuration.

3. The system of claim 1, wherein the classifying of the defect involves determining a material composition of the defect based on the first and second interference patterns.

4. The system of claim 1, wherein the one or more mask elements are located at or near a pupil plane of the collection objective, a pupil plane conjugate to the pupil plane of the collection objective, or any combination thereof.

5. The system of claim 1, wherein a wavelength of the illumination light is at least three times greater than a size of an image of a pixel of the imaging detector projected on the surface of the specimen.

6. The system of claim 1, wherein a spatial separation between the first region of the at least two spatially distinct regions in the collection pupil and the second region of the at least two spatially distinct regions in the collection pupil spans a range of NA from 0.1 to 0.9.

7. The system of claim 1, wherein the first region of the at least two spatially distinct regions in the collection pupil and the second region of the at least two spatially distinct regions in the collection pupil are symmetrically located about a center of the collection pupil.

8. The system of claim 1, wherein a size of a first aperture opening formed by the one or more mask elements in the first configuration at the first region of the at least two spatially distinct regions in the collection pupil is in a range from 0.01 NA to 0.3 NA and a size of a second aperture opening formed by the one or more mask elements in the first configuration at the second region of the at least two spatially distinct regions in the collection pupil is in a range from 0.01 NA to 0.3 NA.

9. The system of claim 8, wherein the size of the first aperture opening is different from the size of the second aperture opening.

10. The system of claim 8, further comprising:
a neutral density filter disposed in an optical path of the transmitted light selected by the one or more mask elements in the first configuration at or near the first region where the first aperture opening is formed by the one or more mask elements.

11. The system of claim 1, further comprising:
a first actuator coupled to a first mask element of the one or more mask elements, the first actuator communicatively coupled to the one or more processors, wherein the first actuator moves the first mask element to a first desired position in response to a first control command communicated from the one or more processors to the first actuator.

12. The system of claim 11, further comprising:
a second actuator coupled to a second mask element of the one or more mask elements, the second actuator communicatively coupled to the one or more processors, wherein the second actuator moves the second mask element to a second desired position in response to a second control command communicated from the one or more processors to the second actuator.

13. The system of claim 1, the collection objective having a Numerical Aperture (NA) spanning at least a range from 0.1 NA to 0.99 NA.

14. A method comprising:
generating a first instance of illumination light and a second instance of illumination light directed to a defect of interest disposed on a specimen;
collecting a first amount of collected light from the specimen in response to the first instance of illumination light;
collecting a second amount of collected light from the specimen in response to the second instance of illumination light, the first and second amounts of collected light including dark field scattering light within a collection pupil of a collection objective;
transmitting a portion of the first amount of collected light, the portion of the first amount of collected light selected by one or more mask elements in a first configuration from at least two spatially distinct regions in the collection pupil;
transmitting a portion of the second amount of collected light, the portion of the second amount of collected light selected by the one or more mask elements in a second configuration from at least two spatially distinct regions in the collection pupil, wherein at least one of the at least two spatially distinct regions in the second configuration is different from at least one of the two spatially distinct regions in the first configuration;
detecting a first interference pattern formed by the transmitted portion of the first amount of collected light at or near a field plane conjugate to the surface of the specimen;
detecting a second interference pattern formed by the transmitted portion of the second amount of collected light at or near a field plane conjugate to the surface of the specimen; and
classifying the defect of interest based on the first and second interference patterns.

15. The method of claim 14, wherein the one or more mask elements are located at or near a pupil plane of the collection objective, a pupil plane conjugate to the pupil plane of the collection objective, or any combination thereof.

16. The method of claim 14, wherein the classifying of the defect involves determining a material composition of the defect based on the first and second interference patterns.

17. The method of claim 14, wherein the first interference pattern is indicative of a first phase difference between the transmitted light from a first region of the at least two spatially distinct regions in the first configuration and the transmitted light from a second region of the at least two spatially distinct regions in the first configuration, and wherein the second interference pattern is indicative of a second phase difference between the transmitted light from a first region of the at least two spatially distinct regions in the second configuration and the transmitted light from a second region of the at least two spatially distinct regions in the second configuration.

18. The method of claim 14, wherein a wavelength of the illumination light is at least three times greater than a size of an image of an imaging detector pixel projected on the surface of the specimen, the imaging detector employed to detect the first and second interference patterns.

19. A system comprising:
an illumination source configured to generate a first instance of illumination light and a second instance of illumination light directed to a defect of interest disposed on a specimen;
a collection objective configured to collect a first amount of collected light from the defect of interest in response to the first instance of illumination light and a second amount of collected light from the defect of interest in response to the second instance of illumination light, the first and second amounts of collected light including dark field scattering light within a collection pupil of the collection objective;
one or more mask elements disposed in a first configuration during the first instance and a second configuration during the second instance, the one or more mask elements in the first configuration transmit a portion of the first amount of collected light from at least two spatially distinct regions in the collection pupil, the one or more mask elements in the second configuration transmit a portion of the second amount of collected light from at least two spatially distinct regions in the collection pupil, wherein at least one of the at least two spatially distinct regions in the second configuration is different from at least one of the at least two spatially distinct regions in the first configuration;

an imaging detector having a photosensitive surface located at or near a field plane conjugate to a surface of the specimen, the imaging detector configured to detect a first interference pattern formed by the transmitted portion of the first amount of collected light at or near the field plane and a second interference pattern formed by the transmitted portion of the second amount of collected light at or near the field plane; and a non-transitory, computer-readable medium storing instructions that, when executed by one or more processors, causes the one or more processors to:
receive output signals indicative of the first and second interference patterns; and
classify the defect of interest based on the first and second interference patterns.

20. The system of claim 19, wherein a wavelength of the illumination light is at least three times greater than a size of an image of a pixel of the imaging detector projected on the surface of the specimen.

* * * * *